United States Patent [19]

Schwarz

[11] 4,066,100

[45] Jan. 3, 1978

[54] CONTROL VALVE

[75] Inventor: Martin Schwarz, Moriken, Switzerland

[73] Assignee: BBC Brown Boveri & Company Limited, Baden, Switzerland

[21] Appl. No.: 709,076

[22] Filed: July 27, 1976

[30] Foreign Application Priority Data

Aug. 14, 1975 Switzerland .................. 10568/75

[51] Int. Cl.² .................. F16K 47/14; F15D 1/00
[52] U.S. Cl. .................. 137/625.3; 137/625.37
[58] Field of Search .................. 137/625.3, 625.37

[56] References Cited

U.S. PATENT DOCUMENTS 3,602,261  8/1971  Brown et al. .................. 137/625.3
3,704,726  12/1972  Lewis .................. 137/625.37 X Primary Examiner—Arnold Rosenthal Attorney, Agent, or Firm—Pierce, Scheffler & Parker

[57] ABSTRACT

A control valve of the type wherein a valve member in the form of a piston moves axially within a piston guide cylinder located in a valve chamber. The valve chamber includes an inlet chamber, an outlet chamber, a valve seat area, and a main flow path and a plurality of by-pass ducts running through an inlet collar and terminating at the valve seat area. A by-pass admission duct which includes an entrance section located in a convexly curved portion of the inlet collar feeds the fluid controlled by the valve to the by-pass ducts and this duct which begins at a rotationally symmetrical throat section of the main flow path is generated by the respective boundary lines of the inlet collar and piston guide cylinder, the shortest connecting line between those boundary lines and an extension of the line which generates the valve seat area.

4 Claims, 1 Drawing Figure

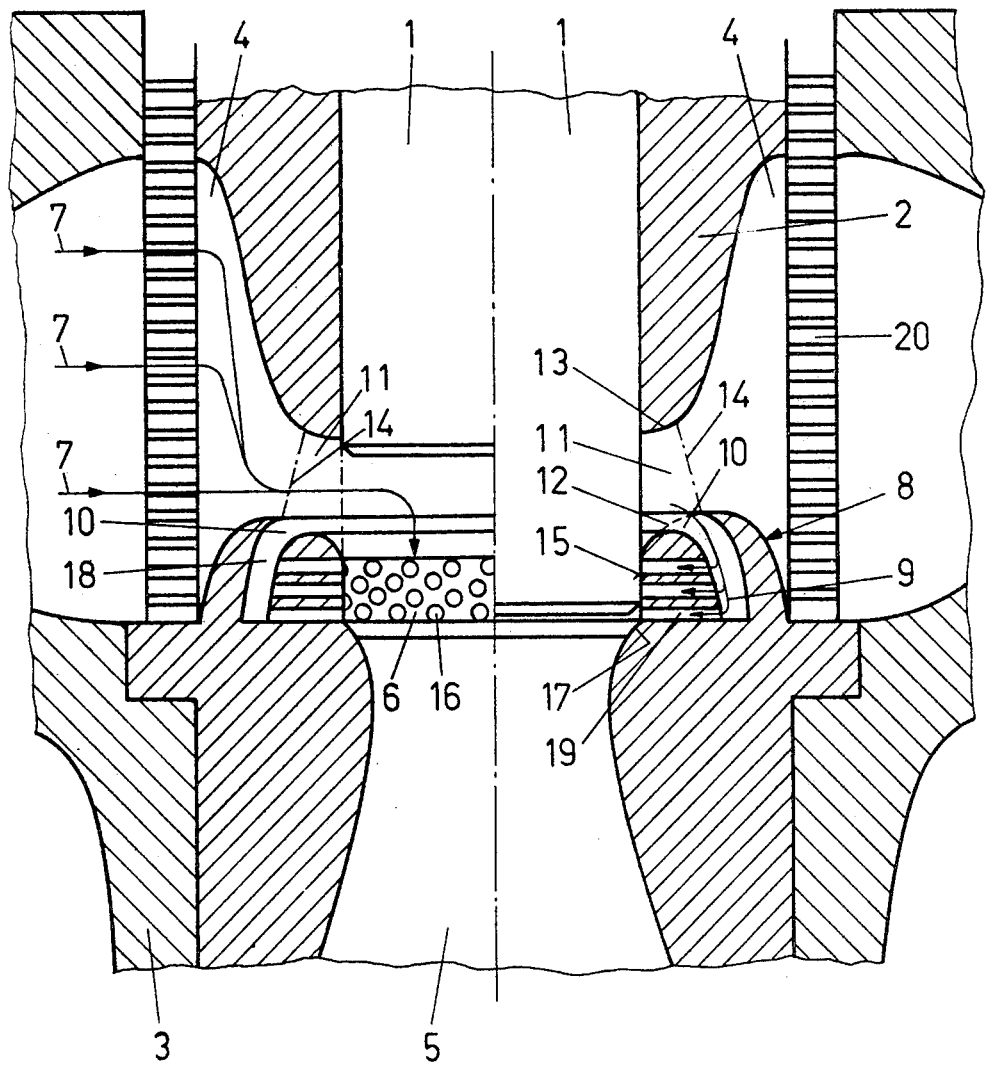

CONTROL VALVE

This invention relates to an improved construction for a control valve with a valve piston which moves in axial direction within a piston guide cylinder of a valve housing, the housing comprising inlet chamber area, an outlet chamber, a valve seat area, a main flow path and by-pass routes running through an inlet collar and comprising a multitude of by-pass ducts ending at the valve seat area and at least one by-pass admission duct which communicates with at least some of the by-pass ducts.

Normally, single-seat steam valves are being used as turbine admission valves. There is known a proposal to design such valves in such manner that they will operate as gate valves with the valve lifts kept at a low magnitude. In order to open the valve, the valve piston is lifted from its seat and is moved upwardly in axial direction within a cylindrical valve seat area. This valve seat area is located in the inside of an inlet collar which is provided with radial bores, ducts or slots, called by-pass routes. When the valve opens, groups of by-pass routes are cleared successively, thus starting a gradually increasing by-pass flow as the only existing flow throughout the course of an initial valve travel, with the valve piston being located within the valve seat area. This specific design makes feasible a high initial lift as well as a gradual increase of the flowthrough, and also a subdivision of the jet of steam that flows into the dissipation area adjacent to the valve inlet collar When the valve stroke continues further, the valve piston emerges from the valve seat area and opens up a main flow path between the valve piston and the inlet collar, thereby initiating a main flow through the valve seat area. The piston is now entering its second valve travel region. During the course of this travel the main flow increases in proportion with the progress of the stroke while the by-pass flow will recede gradually because a higher backpressure is building up within the valve seat area. Although the by-pass flow is thus being reduced in volume, it will still continue to flow when the valve is fully opened and will interfere with the main flow because the by-pass flow enters the point of junction with the main flow at a lateral direction relative to the main flow. This causes a great pressure loss of the fully opened valve, a significant disadvantage of the known valve design.

It is the principal object of the invention to provide a valve where the main flow is not subjected to the adverse influence by the by-pass flow.

A control valve solving the above discussed problem is characterized by the features that the by-pass admission duct begins at a throat section of the main flow path that is rotationally symmetrical, having as generating elements the boundary line of the inlet collar, the boundary line of the piston guide cylinder, the shortest connecting line between said boundary lines, and the extension of the line generating the valve seat area-casing line and that the entrance section of the by-pass admission duct is arranged in a convexly curved portion of the inlet collar.

This novel arrangement of the by-pass routes has the result that these routes will enter the valve system at a point where at the end of the second valve travel region the pressure will be equal to the pressure existing at the outlet apertures that are located downflow. The flow through the by-pass routes will still be at high speed during the partial valve travel, but at a fully opened valve position the by-pass flow will become stagnant. It becomes thus possible to modulate in a simple manner the by-pass flow from a value of zero to a maximum value, and from a maximum value back to zero value, while the main flow will continue to increase until it reaches its maximum. The valve possesses a greater steam-flow capacity, and it is therefore possible to attain lower losses, smaller dimensions, lesser forces within the valve and lower costs of manufacture.

A preferred embodiment of the invention will now be described in detail and is illustrated in the accompanying drawing, the single view of which depicts a single-seat steam valve in longitudinal cross section, its inlet collar being provided with a by-pass admission duct and a multitude of radial by-pass ducts. At the right half of the FIGURE the valve piston is shown at the beginning of its travel, and at the left half in almost fully opened position.

With reference now to the drawing the piston 1 moves within the piston guide cylinder 2 in the axial direction of the valve. The rim of the bottom part of piston 1 is designed as a sealing surface and rests at the correspondingly shaped valve seat 17 when the valve is closed. Above the valve seat 17 there is located the cylindrical valve seat area 6, bordered by the inlet collar 8 which is rotationally symmetrical. The by-pass routes 9, indicated by arrows, comprise a multitude of individual radial by-pass ducts 19 which are in an axial echelon formation and which end at the valve seat area 6, and a by-pass admission duct 18, arranged between two stationary parts of the inlet collar 8 and feeding all by-pass ducts 19 which begin at this admission duct 18. The by-pass admission duct 18, also rotationally symmetrical begins at a rotationally symmetrical throat section 11 of the main flow path 7. The piston guide cylinder 2 has a convexly curved boundary surface 13 which, together with the convexly curved boundary surface 12 of the inlet collar 8 forms the throat section 11 in the shape of a conical surface of revolution having as generatrix a straight line 14 which is substantially normal to both boundary surfaces 12 and 13 and represents the shortest distance between them. The inner boundary of the throat area is esablished by an extension 15 of the cylindrical surface 6 within inlet collar 8 adjacent valve seat 17. The entrance section 10 of the by-pass admission duct 18 located on the downflow side of the throat section 11 is arranged in a convexly curved portion of the inlet collar 8, delimiting the main flow path 7. When the valve is in open position, the valve inlet chamber 4 of the valve housing 3 is in communication with the valve seat area 6 by way of the main flow path 7 as indicated by arrows.

When the valve is closed, the piston 1 is at lift position zero and rests at the valve seat 17. When the stroke increases, the by-pass ducts 19 are being cleared successively, allowing steam to flow through the stainer 20 into the inlet chamber 4 and from there by way of the by-pass routes 9, that is through the by-pass admission duct 18 and the by-pass ducts 19, into the valve seat area 6 and then into the outlet chamber 5 because the steam pressure in the valve seat area 6 and in the outlet chamber 5 is lower than the steam pressure in the valve inlet chamber 4. During the first region of valve travel which ranges from travel position zero to the opening of the main flow path 7, the steam flows into the valve seat area 6 practically only by way of the by-pass routes 9.

As soon as the piston 1 leaves the valve seat area 6, thus opening up the main flow path to this area, the piston is reaching a second region of valve travel. During the course of this travel the steam will still continue to flow into the valve seat area by way of the by-pass routes 9, but its volume will gradually decrease when the valve travel is lengthening because now the difference between the pressures at the outlet apertures 16 and at the entrance section 10 of the by-pass admission duct 18, located on the downflow side of the throat section 11 will become less pronounced as the main flow increases. When the piston reaches a certain predetermined position, which is the terminal point of the second region of valve travel, the pressures at the outlet apertures 16 and at the entrance section 10 of the by-pass routes 9 will be in balance, reducing the by-pass flow to a standstill. This is further due to the fact that the by-pass admission duct 18 branches off from the above defined throat section 11 of the main flow path 7, i.e. from a region where during the course of increasing main flow the pressure will drop downstream along the lines of flow due to the acceleration in flow. This drop in pressure will become even more pronounced in the vicinity of the convex wall of the inlet collar 8, delimiting the flow, because there is generated within the flow along curved flow lines a pressure gradient orthogonally to these lines. Thusly, there is accomplished a pressure equalization between the entrance section 10 and the outlet apertures 16 of the by-pass routes so that the by-pass flow can be brought to stagnation. In this manner the invention accomplishes its aim that at the end of the second region of valve travel practically only the main flow will remain in the active state. Any minor differences in pressure which might occur between the entrance section 10 and the various outlet apertures 16 could lead to the presence of weak by-pass flows through some of the ducts 19 so affected, flows which possibly could take the form of counterflows from the valve seat area 6, backing up in direction of the entrance section 10, but such flows will not influence the main flow in any manner.

I claim:

1. A control valve including a valve housing, a piston guide cylinder located within said housing, a piston slidable within said guide cylinder between a valve-closed position wherein the end of said piston engages a valve seat leading to an outlet chamber in said housing and a valve-open position wherein said piston is disengeged from said valve seat thereby to place said outlet chamber in communication with an inlet chamber in said housing by way of a cylindrical opening through an inlet collar surrounding said valve seat, said inlet collar being provided with a plurality of by-pass ducts having inlets terminating in a by-pass admission duct from said inlet chamber and outlets to said valve seat distributed around said cylindrical opening within said collar and which are progressively engaged by said piston, said inlet collar further including a convexly curved boundary surface which together with a convexly curved boundary surface of said piston guide cylinder forms in said inlet chamber a throat section in the shape of a conical surface of revolution having as generatrix a straight line which is substantially normal to both of said convexly curved boundary surfaces and represents the shortest distance between them, and said by-pass admission duct having an entrance section located on the downflow side of said throat section.

2. A control valve structure as defined in claim 1 wherein said by-pass admission duct is located between two fixedly located parts of said inlet collar.

3. A control valve structure as defined in claim 1 wherein said by-pass admission duct is rotationally symmetrical.

4. A control valve structure as defined in claim 1 wherein said by-pass ducts include outlet apertures arranged in an echelon formation.

* * * * *